United States Patent [19]
Nihei et al.

[11] Patent Number: 5,489,758
[45] Date of Patent: Feb. 6, 1996

[54] HEIGHT-SENSING DEVICE FOR A LASER ROBOT

[75] Inventors: Ryo Nihei; Akihiro Terada, both of Fujiyoshida; Yasuo Sasaki, Minamitsuru; Hiroshi Takamatsu, Anan, all of Japan

[73] Assignee: Fanuc Ltd., Yamanashi, Japan

[21] Appl. No.: 295,794

[22] PCT Filed: Jan. 14, 1994

[86] PCT No.: PCT/JP94/00049

§ 371 Date: Sep. 14, 1994

§ 102(e) Date: Sep. 14, 1994

[87] PCT Pub. No.: WO94/15748

PCT Pub. Date: Jul. 21, 1994

[30] Foreign Application Priority Data

Jan. 14, 1993 [JP] Japan ................... 5-004981

[51] Int. Cl.⁶ ................................. B23K 26/02
[52] U.S. Cl. ................. 219/121.63; 219/121.82; 219/121.78; 219/121.83; 901/42; 228/9
[58] Field of Search ............ 219/121.63, 121.64, 219/121.78, 121.6, 121.54, 121.56, 121.82, 121.83; 228/102, 105, 7, 8, 9; 364/513; 901/3, 42

[56] References Cited

U.S. PATENT DOCUMENTS 4,794,223  12/1988  Barkman et al. ............... 219/124.34
4,920,248  4/1990   Toyoda et al. .................. 219/124.34
5,001,324  3/1991   Aiello et al. .................... 219/121.63
5,006,999  4/1991   Kuno et al. ..................... 219/124.34
5,275,327  1/1994   Watkins et al. ................. 219/124.34

FOREIGN PATENT DOCUMENTS 61-86088    5/1986   Japan.
63-157779   6/1988   Japan.
4-120106    10/1992  Japan.

*Primary Examiner*—Mark H. Paschall
*Attorney, Agent, or Firm*—Nikaido Marmelstein Murray & Oram

[57] ABSTRACT

A laser robot having a height sensing device (13) arranged at a position very close to a laser-beam projecting machining head (9) so that the axis of the height-sensing device (13) is parallel to the longitudinal axis of the machining head (9), the three-dimensional distance data representing the positional relationship between the laser projecting nozzle (9a) of the machining head (9) and the measuring end (13a) of the height-sensing device (13) being stored in advance in the robot controller (10), the longitudinal distance between the height-sensing device (13) and a starting point of laser-beam machining being automatically measured from directly above the starting point, and a longitudinal distance between the laser beam projecting nozzle (9a) of the machining head (9) and the machining starting point being corrected on the basis of the three-dimensional distance data and the longitudinal distance measured by the height sensing device (13) to thereby accurately locate the machining head at a position corresponding to the starting point for the laser machining operation.

6 Claims, 3 Drawing Sheets

HEIGHT-SENSING DEVICE FOR A LASER ROBOT

TECHNICAL FIELD

The present invention relates generally to a laser robot and, more specifically, to a height-sensing device incorporated in a laser robot having, at its extremity, a machining head which projects a laser beam and allows feed motion under the control of an additional-axis device. The additional-axis device is mounted on the robot, provided with two drive motors, and permits machining along a locus having a small diameter for efficient machining of a workpiece using the laser beam projected through the laser beam projecting nozzle of the machining head. The height-sensing device allows the robot to carry out accurate laser beam machining by automatically measuring the longitudinal distance between the surface of the workpiece and the laser beam arc-welding position arc-welding position projecting nozzle of the machining head, and by permitting the robot to correct the longitudinal distance between the laser beam projecting nozzle and the machining start point on the workpiece.

BACKGROUND ART

A laser robot, more specifically, a well known six-axis multi-articulated laser robot having six degrees of freedom of motion (J1 to J6) is provided with a robot wrist, i.e., a movable element attached to the extremity of the robot unit of the laser robot, and is additionally provided with an additional-axis mechanism having two drive motors to increase the degree of freedom of motion. The multi-articulated laser robot moves a machining head which is capable of emitting a laser beam for laser beam machining, using the additional-axis mechanism, along a fixed locus in a plane (two-axis) coordinate system.

Because most of the loci of laser-beam machining are circular and each has a comparatively small diameter, the applicant of the present patent application previously proposed a laser robot capable of forming small holes in the workpiece by precision laser beam machining, and the proposed laser robot is in the initial stage of practical application.

The robot unit of the six-axis multi-articulated laser robot provided with an additional-axis mechanism has the general construction shown in FIG. 2, and, as is generally known, the actions of the robot unit of the robot are controlled during laser beam machining operation by a robot controller 10.

The robot unit 1 of this laser robot has a robot body 3 set in an upright position on a robot base 2, a rotatable robot body 4 supported for rotation (J1) in a horizontal plane on top of the robot body 3, a robot upper arm 5 having one end pivotally joined to one end of the rotatable robot body 4 for turning (J2) about a horizontal axis, and a robot forearm 6 pivotally joined to the extremity of the robot upper arm 5 for turning (J3) about a horizontal axis relative to the robot upper arm 5.

Attached to the extremity of the robot forearm 6 is a three-degrees-of-freedom robot wrist 7 capable of turning (J4 to J6) in a three-dimensional space about three orthogonal axes, and an additional-axis mechanism 8 attached to the robot wrist 7 is provided with a machining head 9 that projects a laser beam.

The additional-axis mechanism 8 is provided with two built-in servomotors, i.e., drive motors, not shown, and controls the laser beam projecting nozzle 9a of the machining head 9, for example, for movement along a desired locus in the plane of an orthogonal two-axis coordinate system according to commands provided by a robot controller 10 to carry out a laser beam machining using a laser beam, such as a cutting operation or a boring operation.

This additional-axis mechanism 8 is principally used for forming holes having small diameters in a workpiece using the machining head 9. The additional-axis mechanism 8 holds the laser beam projecting nozzle 9a of the machining head 9 stationary at a predetermined original position with respect to the additional-axis mechanism 8 while the movable elements of the six-axis system (J1 to J6), i.e., the robot rotatable body 4, the robot upper arm 5, the robot forearm 6 and the robot wrist 7, of the robot unit 1 are in operation.

At the beginning of a laser beam machining operation, the robot unit 1 operates according to a machining program stored beforehand in the robot controller 10 by teaching to bring the laser beam projecting nozzle 9a of the machining head 9 into a position corresponding to the center of a small hole to be formed in the workpiece and to focus the laser beam on the center of the small hole to be formed. Then, the two built-in drive motors are actuated to move the laser beam projecting nozzle 9a and to position the same at a starting point on a desired machining locus for forming the small hole, and the machining head 9 is then moved along the machining locus for a laser beam boring operation.

Nevertheless, the thickness of the workpiece is not necessarily always the same since different parts of the workpiece have different dimensions and different portions of a piece of workpiece have different thicknesses, and the workpiece is not necessarily located exactly at a fixed position in the machining station. Accordingly, the laser beam is defocused regardless of the correct laser beam machining operation of the machining head 9 according to the predetermined machining program, and stable laser beam machining cannot be attained. Consequently, it often occurs that different processed pieces of workpiece are finished to different machining accuracies and have different qualities. It has been a conventional procedure for preventing such difference in machining accuracy and quality between pieces of workpiece to measure the longitudinal distance (vertical distance) between the laser beam projecting nozzle 9a of the machining head 9 and the surface of the workpiece after the machining head 9 has been located at a position corresponding to the center of a desired machining locus by the robot actions of the robot unit 1, so as to correct the longitudinal position of the laser beam projecting nozzle 9a of the machining head 9 on the basis of the difference between a longitudinal distance included in the machining program taught in advance to the robot controller and the measured longitudinal distance, and to refocus the laser beam.

However, the conventional method of measuring the longitudinal distance has the problems as set forth below.

(1) When a method of measuring the height of the laser beam projecting nozzle of the machining head of a laser robot from the work surface of a workpiece with a capacitance type height sensing device attached to the extremity of the machining head is employed, particles sputtered from the workpiece and smoke produced by machining during laser beam machining adhere to and deposit on the extremity of the capacitance type height sensing device to change the capacitance of the capacitance type height sensing device gradually and, consequently, errors are introduced into the measured distance and hence inaccurate correction results.

(2) Another method of measuring the longitudinal distance employs an optical height sensing device, which is attached to the machining head with its optical axis inclined at an angle to the center axis of the machining head so that the optical axis of the optical height sensing device meets the center axis of the machining head at a working point on the surface of the workpiece. This height sensing device must unavoidably be attached to the machining head so as to jut out from the side of the machining head, causing mechanical interference between the height sensing device and various articles and elements surrounding the machining head. Furthermore, since the optical height sensing device projects a measuring beam obliquely onto the surface of a workpiece, the optical height sensing device is able to receive only part of the projected measuring beam and, consequently, a measurement error is introduced into the measurement.

DISCLOSURE OF THE INVENTION

Accordingly, an object of the present invention is to provide a laser robot provided with a height sensing device eliminating the drawbacks in the conventional height sensing devices.

With the foregoing object in view, the present invention attaches a height sensing device, preferably, an optical height sensing device, to the machining head of a laser robot in close contact with the machining head with its axis in parallel to the center axis of the machining head, stores and retains distance data representing the vertical distance between the laser beam projecting nozzle of the machining head and the measuring end of the height sensing device in a three-dimensional space, in the robot controller, measures directly and automatically the longitudinal distance between the laser beam projecting nozzle and a machining starting point, and corrects the longitudinal distance between the laser beam projecting nozzle and the machining starting point on the basis of the measured longitudinal distance.

In accordance with the present invention, there is provided an industrial laser robot provided with a machining head projecting a laser beam, and a height-sensing unit for measuring a distance between a laser beam projecting nozzle of the machining head and a workpiece to be machined, the laser robot comprising:

a bracket unit for mounting the height-sensing unit in close contact with the machining head so as to be in parallel with a center axis of the machining head;

a measuring head unit incorporated in the height-sensing unit for automatically measuring a longitudinal distance between the height-sensing unit and a surface of the workpiece;

a unit for writing known data representing a distance between respective center axes of the measuring head unit and the machining head, and a longitudinal distance between respective tips of the measuring head unit and the machining head in a storage unit provided for a robot controller; and a signal transmitting unit for transmitting, via a feedback signal line, data representing the longitudinal distance measured by the measuring head unit of the height-sensing unit to the robot controller.

BRIEF DESCRIPTION OF THE DRAWINGS

The above and other objects, features and advantages of the present invention will be described hereinafter in connection with a preferred embodiment of the present invention illustrated in the accompanying drawings wherein.

BEST MODE OF CARRYING OUT THE INVENTION

Figure 2:
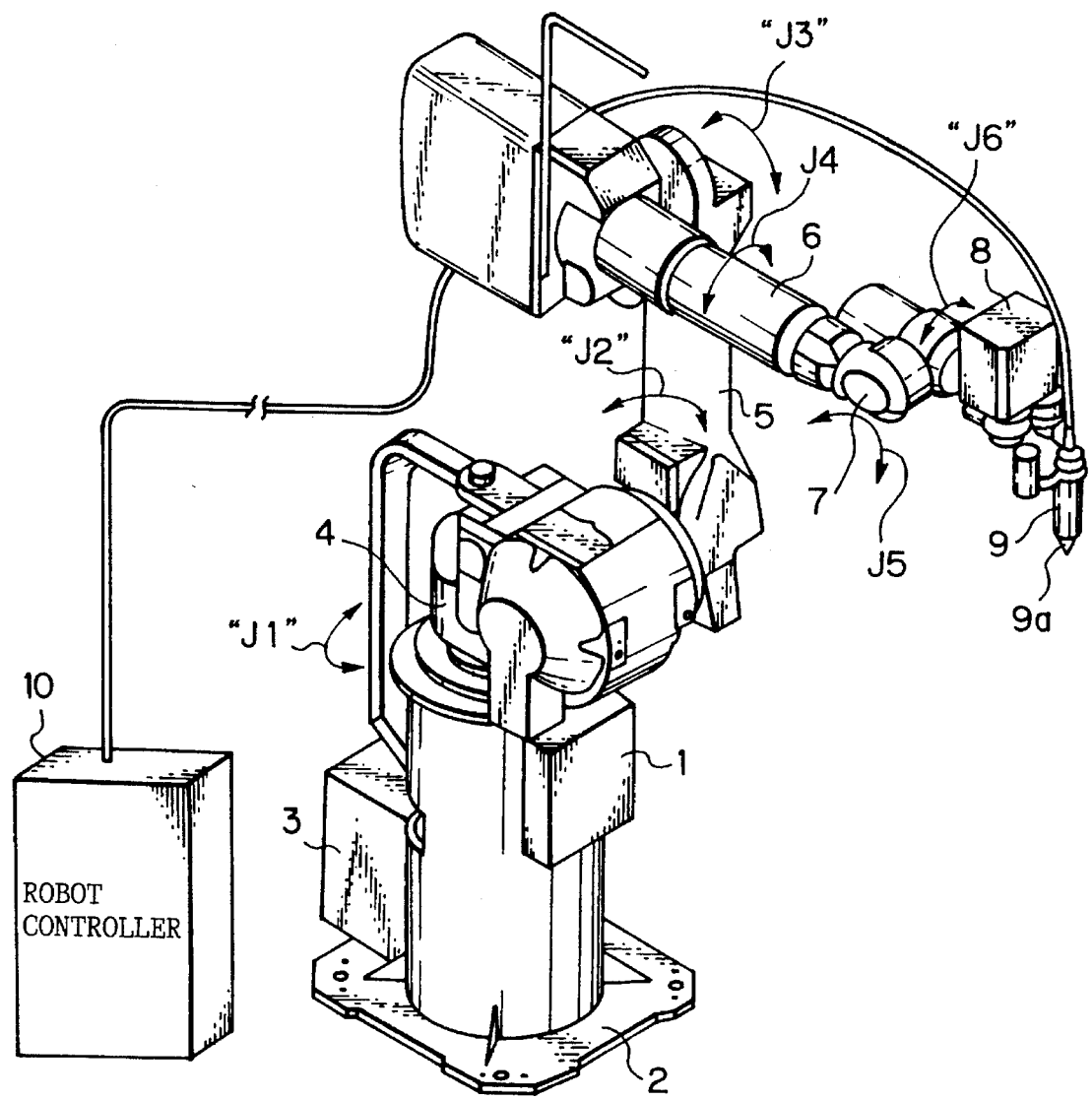
FIG. 2 is a perspective view of the robot unit of a six-degrees-of-freedom articulated laser robot capable of being provided with either an additional-axis mechanism having a height-sensing device embodying the present invention or a conventional additional-axis mechanism.
Figure 3:
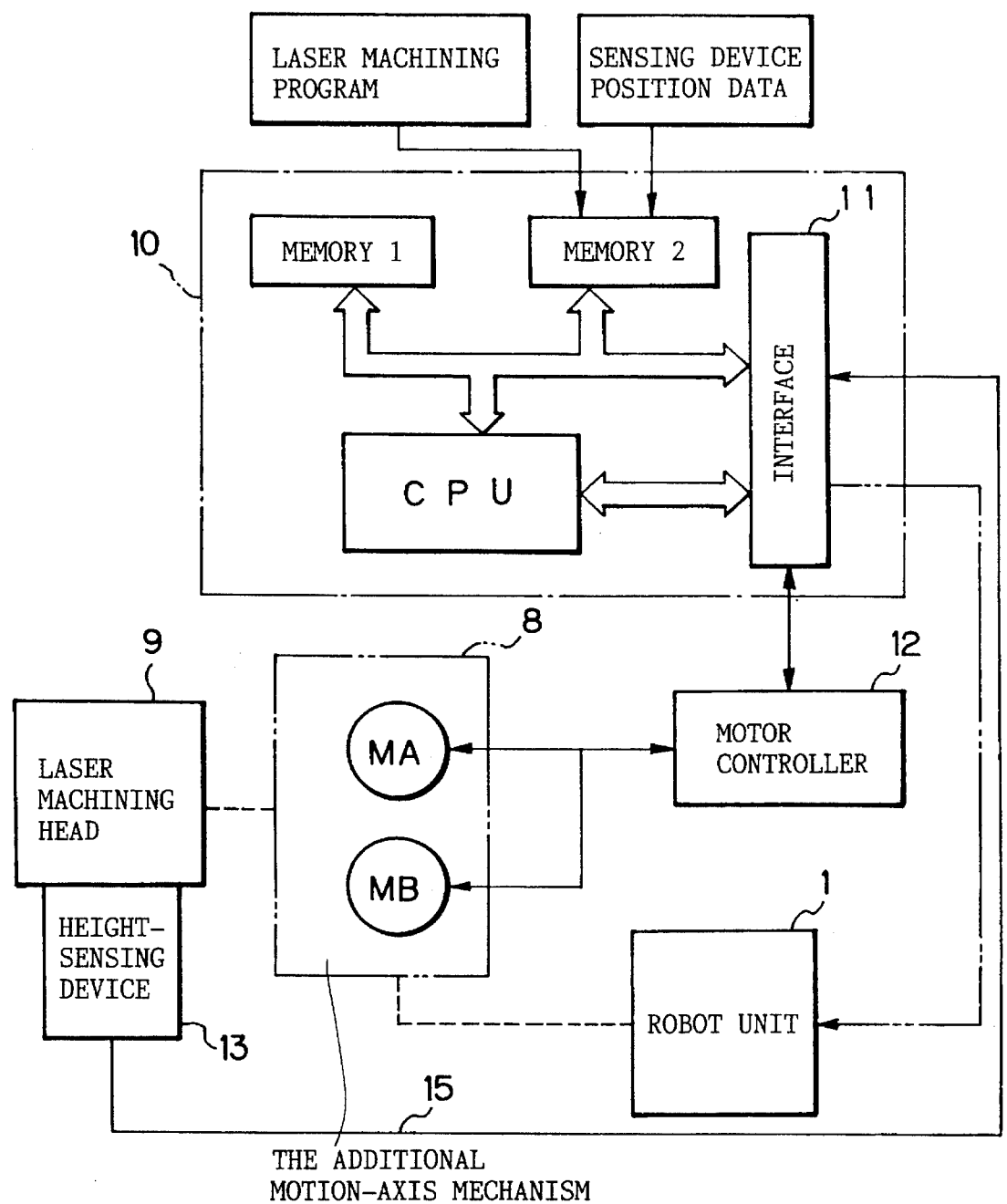
FIG. 3 is a block diagram of the control system of the laser robot provided with the height sensing device embodying the present invention.

Referring to FIGS. 2 and 3, a robot controller 10 is connected to a robot unit 1 by signals lines indicated by an alternate long and two short dashes line to move or locate a machining head 9 for projecting a laser beam, combined with an additional-axis mechanism 8 attached to a robot wrist 7 (FIG. 2) by controlling the motions of the movable elements of the robot unit 1.

The robot controller 10 is a control system storing basic robot control programs and the like in an internal memory 1, i.e., a ROM, storing laser beam machining programs, input thereto by operating an input means, in a rewritable memory 2, i.e., a RAM, and capable of controlling the movable elements of the robot unit 1 through a CPU serving as a control circuit, and an interface 11 according to the basic robot control programs stored in the memory 1 and the laser beam machining programs stored in the memory 2.

Distance data representing the distance between the position of the measuring end 13a (FIG. 1), i.e., the tip, of a height sensing device 13 and the position of the laser beam projecting nozzle 9a of the machining head 9 is stored in advance in the memory 2 of the robot controller 10 in addition to machining conditions for controlling the operation of the additional-axis mechanism 8 for feeding the machining head 9 to carry out laser beam machining.

The additional-axis mechanism 8 is a drive mechanism provided with two drive motors MA and MB, i.e., servomotors. The operation of the drive motors MA and MB is controlled so as to feed the machining head 9 precisely in a plane defined by an orthogonal two-axis coordinate system. The laser robot is provided with the additional-axis mechanism 8 to carry out laser beam machining for forming, for example, the above-mentioned small holes at a high accuracy higher than that possible when laser beam machining is carried out by directly feeding the machining head 9 along a predetermined machining locus by the actions of the movable elements of the robot unit 1 including the rotatable robot body, the robot upper arm, the robot forearm and the robot wrist 7.

The operation of the drive motors MA and MB of the additional-axis mechanism 8 is controlled by a motor control unit 12 connected to the robot controller 10. The motor control unit 12 receives command signals from the robot controller 10 and gives control signals to the drive motors MA and MB of the additional-axis mechanism 8.

Figure 1:
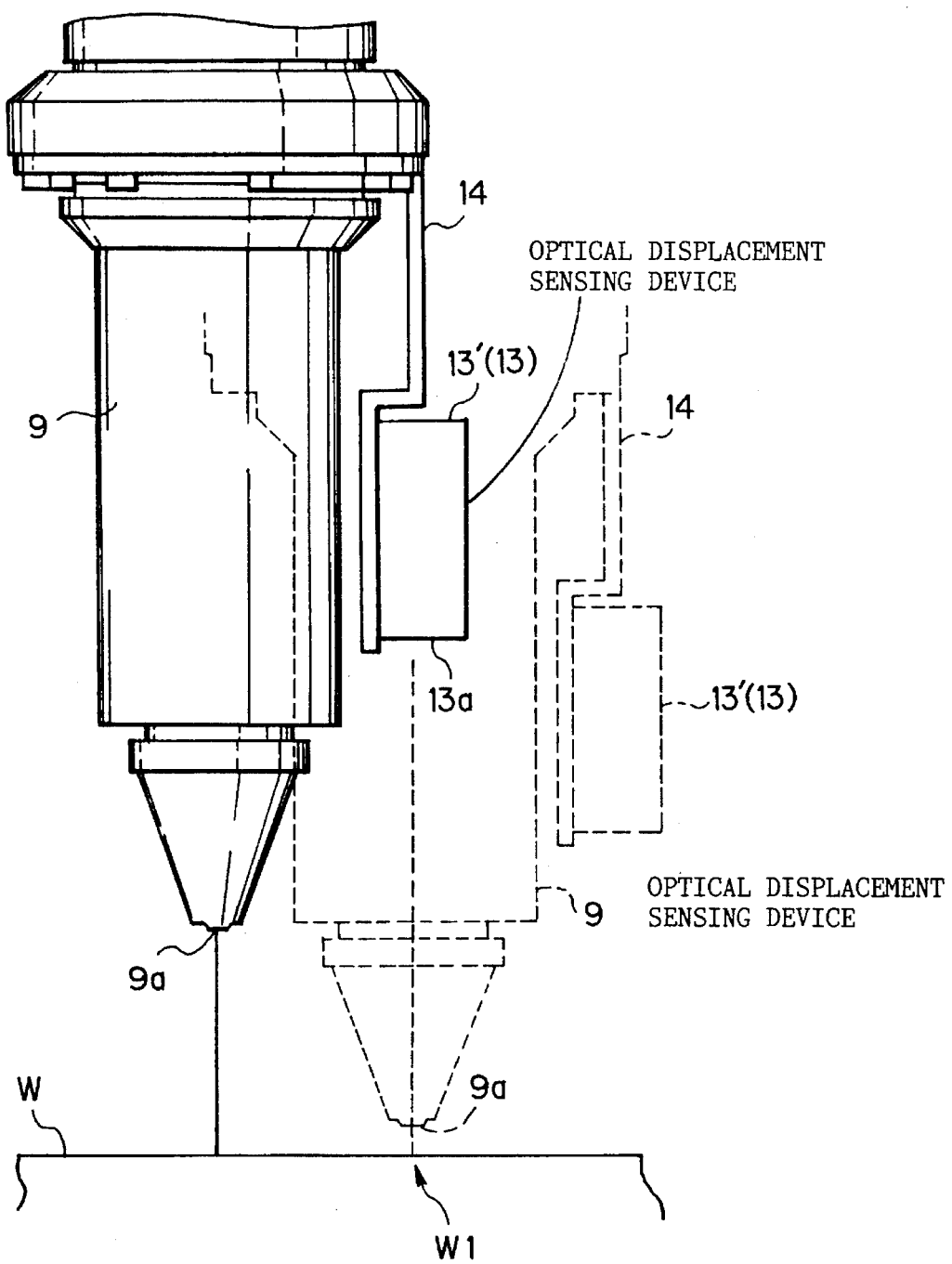
FIG. 1 is a fragmentary, enlarged front view of a portion of a laser robot provided with a height sensing device embodying the present invention and a machining head, including the machining head and the associated parts.

The actions of the height-sensing device 13 for measuring the longitudinal distance between the machining head 9 and the work surface of the workpiece (the height of the machining head 9 from the work surface of the workpiece along the Z-axis), and the correction of the longitudinal distance of the machining head 9 from the work surface of the workpiece (the height of the machining head 9 from the work surface of the workpiece along the Z-axis) when operating the machining head 9 by controlling the additional-axis mechanism 8 by the robot controller 10 will be described with reference to FIGS. 1 to 3.

Referring to FIG. 1, the height sensing device 13 in accordance with the present invention is virtually contiguous with the machining head 9 of the robot unit 1 and is supported by a bracket 14 attached to the upper end of the machining head 9 so as to jut out by the least possible distance from the side of the machining head 9 to reduce the possibility of interference, between the height sensing device 13 and objects surrounding the machining head 9, to the greatest possible extent.

Preferably, the height sensing device 13 is a well known optical displacement sensing device 13'. The height sensing device 13 projects a measuring laser beam and receives the reflected laser beam for distance measurement. As shown in FIG. 3, measured distance data provided by the height-sensing device is passed through the interface 11 to the robot controller 10. The longitudinal position of the laser beam projecting nozzle 9a of the machining head 9 with respect to the work surface of the workpiece is corrected, on the basis of the measured distance data, to focus a machining laser beam.

The positional relationship between the measuring end 13a, through which the measuring laser beam is projected, of the height sensing device 13 and the laser beam projecting nozzle 9a of the machining head 9 is fixed when the bracket 14 is attached to the machining head 9, and, as mentioned above, the distance data representing the respective positions of the measuring end 13a and the laser beam projecting nozzle 9a are stored beforehand in the memory 2 of the robot controller 10.

Therefore, when carrying out laser beam machining by the machining head 9, first the measuring end 13a of the height sensing device 13 is located at a measuring position, namely, a position indicated by continuous lines in FIG. 1, directly above a machining starting point W1 on a workpiece W by the actions of the robot unit 1 of the laser robot on the basis of data obtained by calculating the distance data stored in the memory 2 and position data for specifying the position of the machining head 9 specified in the laser machining program; that is, locating data for locating the laser beam projecting nozzle 9a of the machining head 9 at a position corresponding to the machining starting point W1 is read from the laser beam machining program, and the CPU adds the distance data representing the position of the height sensing device 13 to, or subtracts the same from, the locating data to obtain locating data for locating the 5 measuring end 13a of the height-sensing device 13 at the position above the machining starting point W1. Then, the robot controller 10 controls the robot unit 1 of the laser robot according to the calculated locating data to locate the measuring end 13a at a position directly above the machining starting point W1, i.e., the measuring position indicated by continuous lines in FIG. 1.

The height-sensing device 13 thus located at the measuring position directly above the machining starting point W1 on the workpiece W measures the longitudinal distance between the measuring end 13a and the machining starting point W1 on the workpiece W (distance data with respect to the Z-axis) automatically. Measured longitudinal distance is transmitted through the signal transmitting line 15 and the interface 11 to the memory 2 of the robot controller 10.

Thus, according to the measured longitudinal distance, the CPU of the robot controller 10 rewrites the position data specified in the program stored beforehand, so that the laser beam projecting nozzle 9a of the machining head 9 can be accurately moved to and located at a position on the Z-axis, which corresponds to a focusing position (the position of the laser beam projecting nozzle 9a for focusing the laser beam on the working point) above the machining starting point W1. After thus rewriting the position data, the machining head 9 is driven so as to be located at a machining position indicated by dotted lines in FIG. 1, and then laser beam machining of the workpiece W is started from the machining starting point W1. Thus, the laser beam projected through the laser beam projecting nozzle 9a of the machining head 9 is accurately focused on the machining starting point W1 to carry out precision laser beam machining.

As is apparent from the foregoing description, according to the present invention, the height-sensing device disposed very close to the machining head of the laser robot enables accurate correction of the position data representing the position of the machining head with respect to the longitudinal direction, i.e., with respect to the Z-axis, relative to the machining starting point on the workpiece to improve the accuracy of the laser machining.

Furthermore, since the height-sensing device in accordance with the present invention is disposed very close to the machining head, mechanical interference between the height-sensing device and objects surrounding the height-sensing device can be avoided, and the machining head incorporating the height-sensing device is able to gain access to a working region, to carry out precision laser beam machining, even if the machining head is operated within, for example, the internal space of an automotive body.

Since the distance data representing the distance between the machining head and the height sensing device is registered and stored in the robot controller in advance, the operations for locating the height sensing device at the position corresponding to the machining starting point, the arithmetic operation on the measured data, the correction of the height of the machining head on the basis of calculated data, and the like can be automatically carried out. Accordingly, the machining head can easily be located with high accuracy without entailing an increase in the number of steps in the laser machining operation.

Still further, since the height sensing device in accordance with the present invention can be located at a predetermined measuring position with respect to a workpiece having a complicated three-dimensional shape as well as with respect to a workpiece having a flat shape, the height-sensing device in accordance with the present invention contributes to an improvement in the accuracy of the laser beam machining of a three-dimensional workpiece.

LIST OF REFERENCE CHARACTERS

1 Robot unit
7 Robot wrist
8 Additional-axis mechanism
9 Machining head
9a Laser beam projecting nozzle
10 Robot controller 13 Height sensing device
13a Measuring end
13' Optical displacement sensing device
14 Bracket
15 Signal transmitting line

We claim:

1. An industrial laser robot provided with a machining head projecting a laser beam, and a height-sensing means for measuring a vertical distance between a laser beam projecting nozzle of said machining head and a workpiece to be machined, said laser robot comprising:

a bracket means for mounting said height sensing means at a position closely juxtaposed to said machining head while establishing a parallel relationship between a center axis of said machining head and a center axis of said height sensing means;

a measuring head means incorporated in said height sensing means for automatically measuring a longitudinal distance between said height sensing means and a surface of said workpiece;

a means for known data, representing a distance between respective center axes of said measuring head means and said machining head, and a vertical distance between respective tips of said measuring head means and said machining head, in a storage means provided in a robot controller; and a signal transmitting means for transmitting, via a feedback signal line, data representing said vertical distance measured by said measuring head means of said height sensing means to said robot controller to thereby allow said machining head to move to a position where the laser beam is focussed onto said surface of said workpiece.

2. A laser robot according to claim 1, wherein said height sensing means comprises an optical displacement sensing device.

3. A laser robot according to claim 1, wherein said robot controller is provided with an arithmetic operating means for calculating corrected longitudinal distance data representing a longitudinal distance between said surface of said workpiece and said laser beam projecting nozzle of said machining head for projecting a laser beam on the basis of said known data stored in said storage means and the measured longitudinal distance data measured by said measuring head means of said height sensing means.

4. A laser robot according to claim 1, wherein said laser robot has a six-degrees-of freedom of motion and is provided with a plurality of movable means including a robot wrist, and wherein said machining head projecting a laser beam is attached to said robot wrist.

5. A laser robot according to claim 1, wherein said machining head projecting a laser beam is mounted, via a two-degrees-of-freedom additional-axis mechanism, on said robot wrist.

6. A laser robot according to claim 1, wherein said bracket means comprises a cranked element having one vertical portion attached to an upper position of said machining head and the other vertical portion arranged below and connected to said one vertical portion of said cranked element permitting the closely juxtaposed mounting of said height sensing means.

* * * * *